United States Patent [19]

Watkins

[11] Patent Number: 4,963,216
[45] Date of Patent: Oct. 16, 1990

[54] METHOD AND APPARATUS FOR THE ASSEMBLY OF FRICTION COMPONENTS

[75] Inventor: Adrian H. Watkins, Rugby, England

[73] Assignee: Automotive Products plc, Warwickshire, England

[21] Appl. No.: 377,318

[22] Filed: Jul. 10, 1989

[30] Foreign Application Priority Data

Jul. 27, 1988 [GB] United Kingdom ............... 8817493

[51] Int. Cl.$^5$ .................... B32B 31/12; F16D 69/04
[52] U.S. Cl. .................... 156/291; 156/356; 156/538; 156/578; 192/107 M
[58] Field of Search ............... 156/291, 295, 356, 538, 156/578; 192/30 R, 30 V, 106.1, 107 M

[56] References Cited

U.S. PATENT DOCUMENTS 4,291,794  9/1981  Bauer .......................... 192/107 M
4,747,476  5/1988  East et al. .................... 192/107 M Primary Examiner—Robert A. Dawson
Attorney, Agent, or Firm—Nixon & Vanderhye

[57] ABSTRACT

Method and apparatus for the manufacture of a friction clutch plate. First and second friction components are placed on first and second jig means, a bead of adhesive elastomeric material is deposited on the first friction component and a metal carrier plate is placed on top of the bead. A bead of adhesive elastomeric material is deposited on the second friction component and the latter is placed on to the metal carrier plate with the face of the friction component on which the bead was deposited being against the metal carrier plate. The two friction components and the carrier plate are held together for a time such that the assembly is handleable. One jig means can be adapted to receive and locate a friction component on one face and a metal carrier plate on a second face, and robot means can be used for depositing the beads of adhesive elastomeric material.

10 Claims, 3 Drawing Sheets

METHOD AND APPARATUS FOR THE ASSEMBLY OF FRICTION COMPONENTS

The present invention relates to a method of apparatus for the deposition of a bead of an elastomeric material. The method and apparatus are adapted particularly, though not exclusively, for use in the manufacture of adhesively-bonded clutch plates of the type used in motor vehicles.

Clutch plates of the type used in motor vehicle transmissions and manufactured by the technique of adhesively-bonding friction facings onto a metal carrier plate are described in GB 2191830.

It is necessary in the manufacture of these types of clutch plate that the bead of elastomeric material, for example, silicone rubber, is deposited in a desired form, for example a dimensionally uniform strip on the friction material and that the placing of the bead on the friction material is also spacially accurate.

Beads of material may be deposited in the form of a multiplicity of concentric circles or in the form of a continuous spiral from the outer to the inner periphery of an annular-shaped member of the friction material. It is further necessary for the two outer faces of the assembled clutch plate to be parallel with each other and also that the inner metal carrier plate be similarly parallel with the two outer faces of the friction material. Furthermore, all three components, i.e. the two friction facings and the metal carrier plate, are required to be concentric with each other.

According to a first aspect of the present invention a method for the manufacture of a friction clutch plate comprises the steps of placing first and second friction components in first and second jig means respectively, depositing a bead of adhesive elastomeric material on the upper face of the first friction component, placing a metal carrier plate on top of the deposited bead, depositing a bead of adhesive elastomeric material on one face of the second friction component, placing the face of the second friction component having the elastomeric bead on top of the metal carrier plate and holding the two friction components and metal carrier plate together for a desired time period such that the assembled clutch plate is handleable prior to curing the elastomeric material.

In the manufacture of clutch plates by the method of this invention the friction components will generally be clutch facings which are annular in form. These may conveniently be initially held in said first and second jig means one above the other, coaxial but spacially separated to allow a bead to be applied to the lower facing. The bead is applied to the lower facing, the metal carrier plate is placed on to it, again coaxial with the lower facing, a bead is applied to the upper facing and the latter is then inverted whilst held by its jig means lowered on to the carrier plate.

Once assembled together the clutch plate is held together, preferably in the jig means, until it has reached a handleable state. The length of time involved here will depend upon the particular adhesive chosen for the beads.

In the assembled clutch plate the friction components and the carrier plate are held together to ensure proper contact between the carrier plate and the adhesive bead on each friction component, but the pressure used is preferably insufficient to squeeze the adhesive out of the form of a bead, in order that air passages remain between the friction components and the carrier plate.

Preferably the beads of adhesive elastomeric material are each laid onto the friction components in a spiral formation.

According to a second aspect of the present invention apparatus for carrying out the method of the first aspect comprises first jig means mounted on a base to receive and centrally locate a first friction component, second jig means vertically above the first jig means, said second jig means being movable in the vertical direction and rotatable about an axis transverse to the vertical axis, said second jig means being adapted for receiving and locating a second friction component on a first face of said second jig means for receiving a metal carrier plate on a second face of said second jig means, automated handling means adapted for placing first and second friction components and said carrier plate on said first and second jig means, adhesive depositing means adapted to deposit a bead of adhesive elastomeric material on one face of each of said first and said second friction components, said jigs being adapted to move sequentially to position said metal carrier plate between the faces of the friction components having said elastomeric beads and further adapted to hold said assembled components together for a predetermined time.

The first jig means is preferably provided with centering means to locate an annular clutch facing and vacuum holding means to hold said facing in its position on the jig means.

The second jig means, on its first face, is preferably provided with centering means to locate an annular clutch facing and vacuum holding means to hold said facing, and on its second face is preferably provided with centering means to locate a metal carrier plate, and electromagnets to hold said plate in position.

Since it is important, for accurate assembly of an annular clutch plate, that the three components of the clutch plate are assembled in a coaxial relationship, the first and second jig means are preferably provided with co-operating centering means which will interact as the two jigs are moved into close proximity with each other to ensure that the jig means are aligned in a desired manner i.e. with the components held in coaxial relationship.

The co-operating centering means may, for example, be a recess in the first jig means, and a corresponding spigot on each face of the second jig means so that the centering is operable whichever face of the second jig means is being presented to the first jig means.

The adhesive depositing means may be, for example, a cam operated manipulating arm, carrying a nozzle for laying a bead of adhesive. Preferably, however, the adhesive depositing means is robot means, e.g. a robotic arm carrying one or more nozzles for laying the bead. The robot means may be programmed to lay the bead in any desired pattern, e.g. a spiral, whilst laying a bead of precisely defined cross section.

In order that the present invention may be more fully understood examples will now be described by way of illustration only with reference to the accompanying drawings of which:

Figure 1:
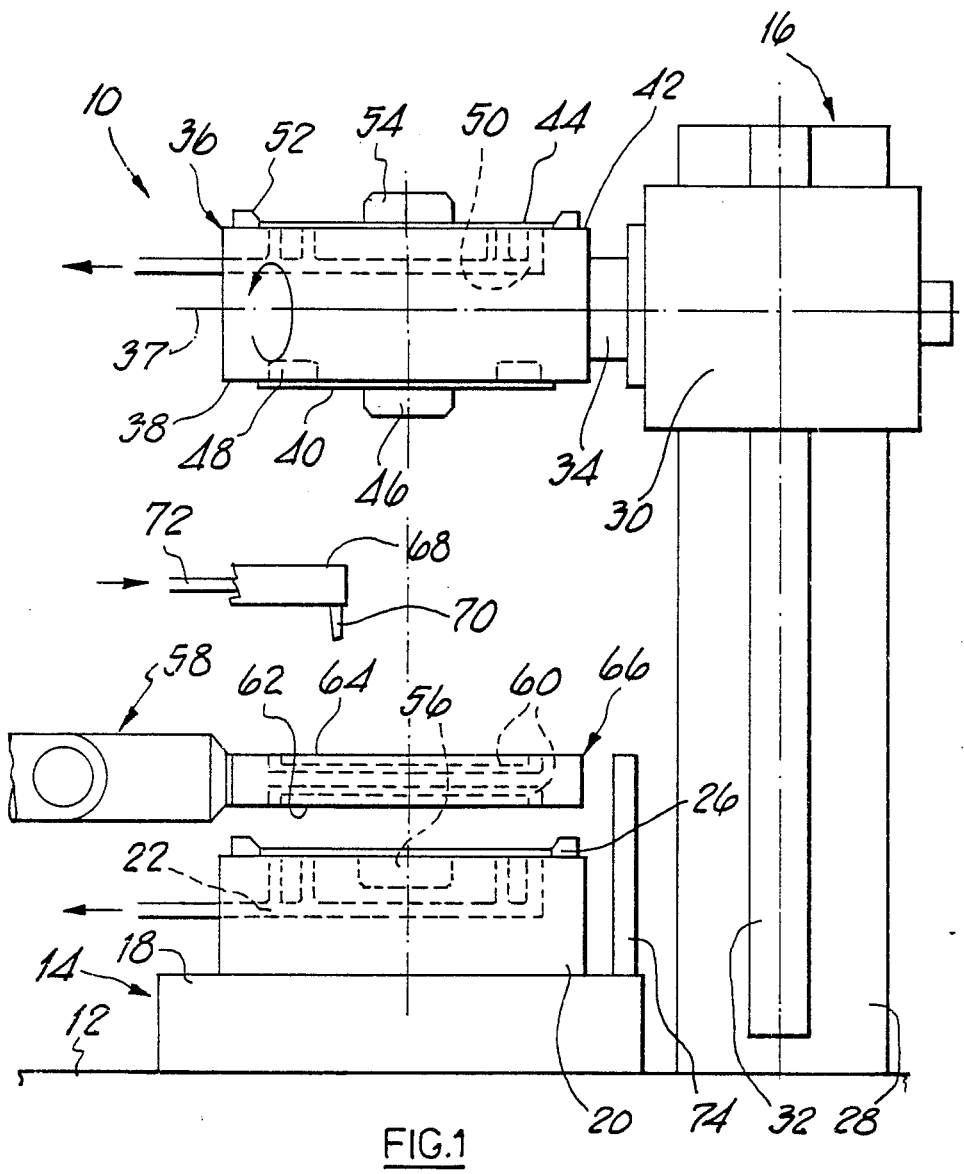
FIG. 1 shows a schematic representation of a unit of apparatus according to the present invention for the manufacture of adhesively-bonded clutch plates.

Referring now to the drawings and where the apparatus is denoted generally at 10. The apparatus comprises a base 12 on which is mounted a lower jig assembly 14 and a vertical slide unit 16. The lower jig 14 includes a base block 18 having a locating fixture 20 with vacuum facility 22 for firmly holding down a friction facing 24 onto the fixture 20 to ensure flatness of the facing 24. The facing 24 is held centrally in the fixture 20 by locating fingers 26.

The vertical slide unit 16 includes a pillar 28 and a slide 30 which is raised and lowered by a pneumatic drive 32. The slide 30 has a motor-driven spindle 34 on which is mounted an upper jig assembly 36. The spindle 34 is able to rotate the jig assembly 36 through 180° about the spindle axis 37. The jig assembly 36 comprises a first face 42 for receiving a second friction facing 44, and a second face 38 for receiving a metal carrier plate 40. The carrier plate 40 may be located by its central hole on a spigot 46 and is retained by electro-magnets 48. The second friction facing 44 is held on the face 42 again by a vacuum facility 50. The facing 44 is located centrally by fingers 52. A second spigot 54 is also located centrally on the face 42. The spigots 46 and 54, at a stage in the production process, are received in a co-operating recess 56 in the locating fixture 20. A mechanical handling arm 58 having a vacuum facility 60 on each of the two faces 62 and 64 of a plate 66 adapted to pick up friction facings, carrier plates and clutch plates at various stages in the process. The arm 58 is operated under a known external control system (not shown) and is adapted to swing out of the vertical path of the jig assenbly 36. A second arm 68 (shown in part only) and moved under control of a known robot and control system (not shown) has a nozzle 70 which is connected to a conduit 72 for the supply of adhesive elastomer, for example silicone rubber. Swinging latches 74 allow an even, predetermined pressure to be applied to the assembled clutch plate. The robot arm is programmed to deposit a bead of a desired pattern on one surface of each of the friction facings 24 and 44. Such beads may, for example, be in the form of several concentric circles or in a spiral. The supply of silicone rubber is from a reservoir (not shown) and may be supplied via known pumping and dosing equipment (not shown). The nozzle 70 and associated pumping equipment (not shown) supplies metered quantities of the elastomeric material and is powered by a control system (not shown).

Figure 2:
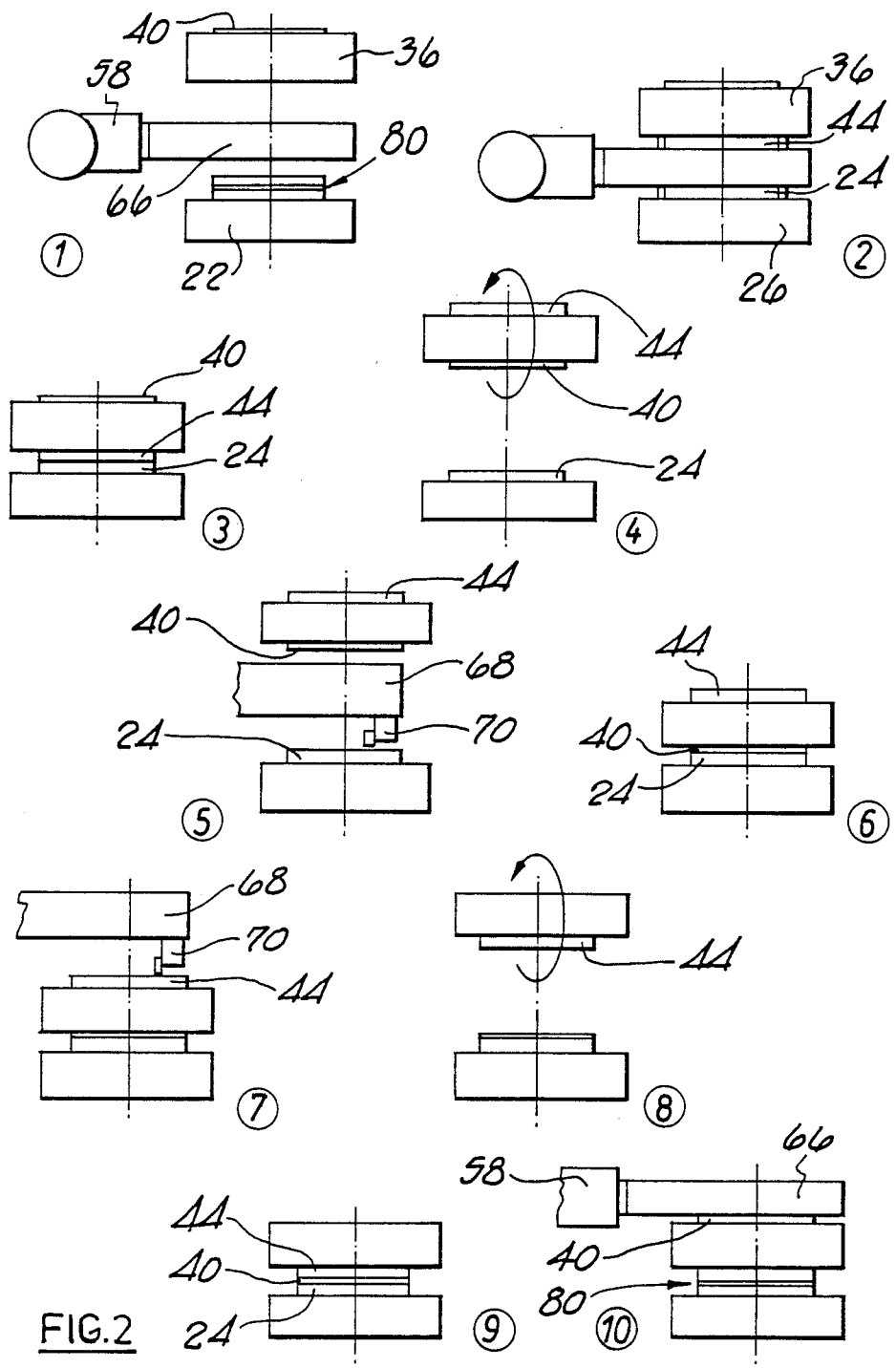
FIG. 2 shows a sequence of diagrams from 1 to 10 indicating the operation of the apparatus of FIG. 1.

Referring now to FIG. 2 which shows the sequence of events in the manufacture of an adhesively-bonded clutch plate. The arm 58 swings in to remove an assembled clutch plate 80 from the jig 20 by means of the vacuum facility 60 (Diagram 1). After the plate 80 has been removed the arm 58 swings back with a clutch-facing 24 and 44 on each of the faces 62 and 64 respectively of the plate 66. Facing 24 is placed on jig 26 and the arm 58 is then raised to place facing 44 on jig 36, the arm 58 then being swung away. The jig 36 can then be brought down so that the facings 24 and 44 are in contact and pressure can be applied by the pneumatic drive 32 to ensure that the facings are hard down and thus flat on the jigs 14 and 20 as shown in Diagrams 2 & 3 (NB this step may not be necessary for all facings). The jig 36 is then raised and rotated through 180° by the motor-driven spindle 34 (Diagram 4). The robot arm 68 is then moved in under control to deposit a desired bead pattern of adhesive via the nozzle 70 on the upper face of the friction facing 24 (Diagram 5). The jig 36 is then lowered to place the carrier 40 on the adhesive bead by releasing the carrier from the electro-magnets 48. The spigot 46 and recess 56 ensure that the carrier is placed concentrically on the facing 24 (Diagram 5). The arm 68 and nozzle 70 then lays down a second bead, which may be identical to the first, if in a spiral pattern, on the upper face of the second facing 44 (Diagram 7). The jig 36 is then raised to allow rotation through 180° (Diagram 8) and immediately lowered to place the second facing 44 on top of the carrier 40. A predetermined pressure is applied by the swinging latches 74 and is maintained for a predetermined time (Diagram 9). Whilst the jig 36 is in the hold-down position the arm 58 places a new carrier 40 on the upper surface of the jig 36 in readiness for the next cycle.

Figure 3:
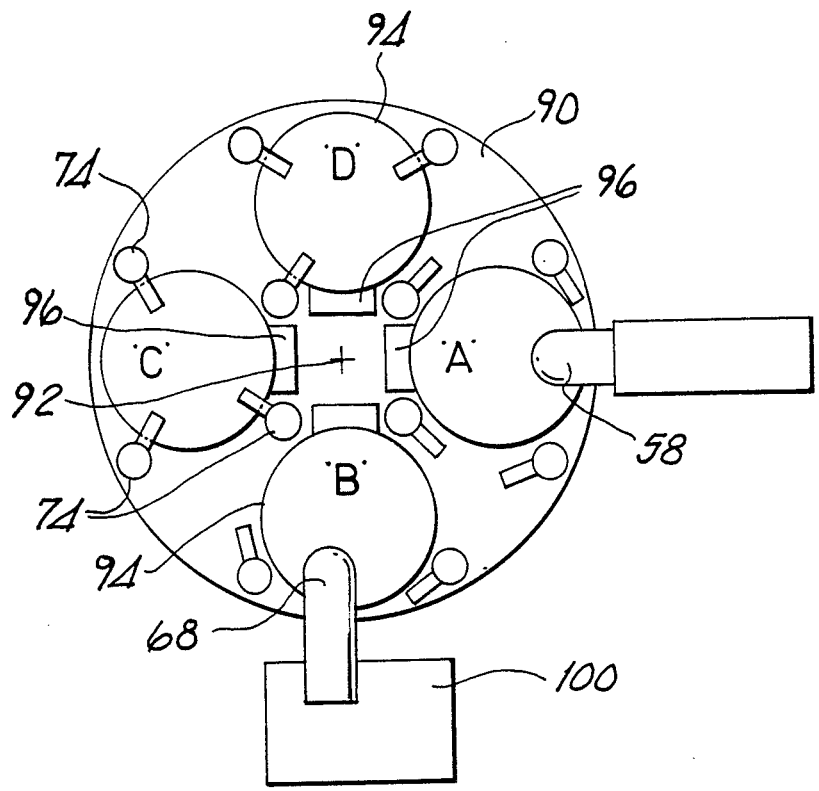
FIG. 3 which shows a schematic diagram of an apparatus comprising four of the units shown in FIG. 1.

FIG. 3 shows a plan view of an apparatus having an indexing table 90, having four stations A, B, C and D, which is rotatable about the centre 92. The positions of the upper and lower jigs 20 and 36 are indicated by the circles 94 whilst four vertical slides are indicated at 96. The table indexes in a clockwise direction under a fixed station manipulating arm 58 and a bead laying robot 100 having an arm 68. At Station 'A' and before Station 'D' the operation described in respect of Diagrams 10 and 1 to 4 of FIG. 2 are carried out. The operations shown in Diagrams 5 to 7 are carried out at Station 'B'. At Stations 'C' and 'D' the clutch plates are finally assembled and the adhesive allowed to partially cure.

Although specific examples have been given above for various parts of the apparatus, it will of course be appreciated that other means could be employed. For example, the vacuum holding means could be replaced with mechanical retention of the friction facings, the motor-driven spindle 34 may be an air rotary actuator, and the electro-magnets 48 may be replaced by vacuum holding means.

Other features may similarly be changed without departing from the invention.

The above example is described as having two robots or mechanical handling arms. The tasks of both of these could, however, be accomplished by a single, appropriately programmed robot arm.

Similarly, in the embodiment of the apparatus illustrated in FIG. 1, there is a single vertical slide unit on which the second jig unit is movable mounted. For larger sizes of clutch plate it would be preferred to provide a pair of vertical slide units with the second jig unit slung between them in order to better ensure that the second jig unit can be kept in a horizontal plane.

As illustrated and described above, the arm 58 is provided with a vacuum holding facility on each of the faces 62 and 64 respectively. Electro magnets may also be provided on either or both of these faces for picking up and holding steel carrier plates and/or assembled clutch plates

I claim:

1. A method for the manufacture of a friction clutch plate which comprises the steps of placing first and second friction components in first and second jig means respectively, depositing a bead of adhesive elastomeric material on the upper face of the first friction component, placing a metal carrier plate on top of the deposited bead, depositing a bead of adhesive elastomeric material on one face of the second friction component, placing the face of the second friction component having the elastomeric bead on top of the metal carrier plate and holding the two friction components and metal carrier plate together for a desired time period such that the assembled clutch plate is handleable prior to curing the elastomeric material.

2. A method according to claim 1 in which the first and second friction components are annular clutch facings and are initially held in said first and second jig means one above the other, coaxial but spacially separated to allow said bead to be applied to the lower facing, the bead is applied to the lower facing, the carrier plate is placed on to it, again coaxial with the lower facing, the bead is applied to the upper facing and the latter is then inverted whilst held by its jig means and lowered onto the carrier plate.

3. A method according to claim 1 in which the assembled clutch plate is held together in the jig means in which the friction components are initially placed.

4. A method according to claim 3 in which the friction components and the carrier plate are held together so as to ensure contact between the carrier plate and the adhesive bead on each friction component, but under a pressure which is insufficient to squeeze the adhesive out of the form of a bead in order that air passages remain between the friction components and the carrier plate.

5. Apparatus for the manufacture of a clutch plate by the method of claim 1 said apparatus comprising first jig means mounted on a base to receive and centrally locate a first friction component, second jig means vertically above the first jig means, said second jig means being movable in the vertical direction and rotatable about an axis transverse to the vertical axis, said second jig means being adapted for receiving and locating a second friction component on a first face of said second jig means and for receiving a metal carrier plate on a second face of said second jig means, automated handling means adapted for placing first and second friction components and said carrier plate on said first and second jig means, adhesive depositing means adapted to deposit a bead of adhesive elastomeric material on one face of each of said first and said second friction components, said jigs being adapted to move sequentially to position said metal carrier plate between the faces of the friction components having said elastomeric beads and further adapted to hold said assembled components together for predetermined time.

6. Apparatus according to claim 5 in which the first jig means is provided with centering means to locate an annular clutch facing and vacuum holding means to hold said facing in position on the jig means.

7. Apparatus according to claim 5 in which the second jig means is provided on said first face with centering means to locate an annular clutch facing, and vacuum holding means to hold said facing in position, and is provided on said second face with centering means to locate a metal carrier plate and electromagnets to hold said plate in position.

8. Apparatus according to claim 5 in which said first and second jig means are provided with co-operating centering means which interact as the two jigs are moved into close proximity with each other to ensure that the jigs are aligned in a desired manner 9. Apparatus according to claim 8 in which the co-operating centering means comprise a recess in the first jig means, and a spigot on each face of the second jig means which will locate in said recess as the jigs are moved into close proximity whichever face of said second jig means is being presented to said first jig means.

10. Apparatus according to claims 5 in which the adhesive depositing means comprises a robotic arm carrying one or more nozzles for laying the bead

* * * * *